| United States Patent [19] | [11] Patent Number: 4,835,224 |
| Ruckes et al. | [45] Date of Patent: May 30, 1989 |

[54] PROCESS FOR THE PREPARATION OF POLYAMINES AND THEIR USE FOR THE PRODUCTION OF POLYURETHANES

[75] Inventors: Andreas Ruckes, Leverkusen; Werner Rasshofer, Cologne; Klaus König, Odenthal; Richard Kopp, Cologne, all of Fed. Rep. of Germany

[73] Assignee: Bayer Aktiengesellschaft, Leverkusen, Fed. Rep. of Germany

[21] Appl. No.: 173,349

[22] Filed: Mar. 24, 1988

[30] Foreign Application Priority Data

Mar. 28, 1987 [DE] Fed. Rep. of Germany ....... 3710427

[51] Int. Cl.$^4$ ............................................... C08G 18/00
[52] U.S. Cl. ..................... 525/453; 525/459; 525/460; 528/48; 528/52; 528/57; 528/68; 528/76; 528/80; 564/308; 564/330; 564/453; 564/454; 564/461; 564/511
[58] Field of Search .................. 525/453, 459, 460; 528/48, 52, 57, 68, 76, 80; 564/308, 330, 453, 454, 461, 511

[56] References Cited

U.S. PATENT DOCUMENTS

| 4,386,218 | 5/1983 | Rasshofer et al. | 564/38 |
| 4,515,923 | 5/1985 | Fauss et al. | 525/127 |
| 4,540,720 | 9/1985 | Rasshofer et al. | 521/159 |
| 4,565,645 | 1/1986 | Rasshofer et al. | 252/182 |

FOREIGN PATENT DOCUMENTS

| 219035 | 4/1987 | European Pat. Off. |
| 2948419 | 8/1981 | Fed. Rep. of Germany |
| 3223400 | 6/1982 | Fed. Rep. of Germany |

OTHER PUBLICATIONS

The Organic Chemistry of Nitrogen by N. V. Sidgwick, Clarendon Press, Oxford, pp. 236 and 326, 1966.
Advanced Organic Chemistry: Reactions, Mechanisms, and Structure, by J. March, McGraw Hill, p. 658, 1968.

*Primary Examiner*—Maurice J. Welsh
*Attorney, Agent, or Firm*—Gene Harsh; Joseph C. Gil; Richard E. L. Henderson

[57] ABSTRACT

Polyamines are produced by hydrolyzing an isocyanate compound in the presence of at least one of a selected group of catalysts and a water miscible polar organic solvent in substantially homogeneous phase at 40°–170° C. The catalyst employed is selected from potassium hydroxide, rubidium hydroxide, cesium hydroxide, potassium alcoholates, rubidium alcoholates, cesium alcoholates, potassium carboxylates, rubidium carboxylates and cesium carboxylates. These polyamines are useful in the production of polyurethane(urea)s.

13 Claims, No Drawings

PROCESS FOR THE PREPARATION OF POLYAMINES AND THEIR USE FOR THE PRODUCTION OF POLYURETHANES

BACKGROUND OF THE INVENTION

This invention relates to a single stage process for the preparation of polyamines containing primary amino groups. This invention also relates to the use of the polyamines according to the invention for the production of polyurethane(urea)s.

It is known that isocyanates can be converted into amines by acid or basic catalysis. Such processes are described in "The Organic Chemistry of Nitrogen" by N.V. Sidgwick, Clarendon Press, Oxford, page 236 (1966) and in "Advanced Organic Chemistry: Reactions, Mechanisms and Structure" by J. March, McGraw-Hill Book Co., New York, page 658 (1968). Sidgwick mentions the possibility of hydrolyzing isocyanate groups by alkaline hydrolysis, but only in non-specific and general terms.

Multi-stage hydrolysis processes (DE-A-No. 2,948,419, DE-AS No. 3,039,600, DE-SO No. 3.131,252) as well as single stage processes (3,223,400 EP No. -97,299, DE-OS No. 3,223,398/EP No.-97,298 and DE-OS No. 3,223,397/EP No. -97,290) have been disclosed. In the single stage hydrolysis process of DE-OS No. 3,223,400, "etherial solvents" are used together with tertiary amines as catalysts. DE-OS No. 3,223,398 discloses a process in which polar solvents such as dimethylformamide are used together with tertiary amines or relatively large quantities of alkali metal hydroxides, alkali metal silicates or alkali metal cyanides as catalysts. Polar solvents are used together with carbonates or carboxylates as catalysts in the process disclosed in DE-OS No. 3,223,397.

The known processes for the preparation of polyamines are all relatively complicated. Even in the known single stage processes further simplification resulting in the production of polyamines even more economically and with even better conversion rates of NCO/NH$_2$ (i.e. higher NH$_2$ numbers) by even smoother reactions would be advantageous. It would be desirable to have a process with the following advantageous features: (a) no filtration required; (b) no distillative separation of a tertiary amine catalyst required; and (c) drastic reduction in the quantity of catalyst required so that the catalyst may be left in the polyamine.

It would also be desirable to obtain as far as possible quantitative conversion of NCO groups into NH$_2$ groups (high conversion rates of NCO/NH$_2$ to yield a high amine number close to the theoretical value) as well as: (a) very low proportion of monomeric amines; (b) no formation of by-products which must be removed; and (c) the ability to work up the polyamines and auxiliary substances by simple methods.

A process leading to end products which contain only a very small proportion of low molecular weight diamines or polyamines would be advantageous.

It is desirable for various reasons to reduce the proportion of monomeric amine in the relatively high molecular weight amino polyethers and amino polyesters as far as possible. Reduced monomeric amine results in reduced physiological risk, reduction of the well known deleterious effect of free aromatic low molecular weight amines on the resistance of amino polyethers or esters and of the polyurethanes produced from them to light and discoloration and enables consistent production of polyurethane products with reproducible properties.

One possible method for keeping the monomeric amine content (e.g. the TDA content) in the high molecular weight polyamine(s) very low is to reduce the monomeric low molecular weight isocyanate content (e.g. TDI content) in the corresponding isocyanate prepolymer(s) before hydrolysis. Such reduction may be accomplished by thin layer evaporation or distillation. These methods are, however, expensive and complicated.

In another approach to obtaining an end product containing only a low proportion of low molecular weight amine, a sub-equivalent quantity of diisocyanate (based on the "ideal" isocyanate prepolymer (NCO/OH ratio 2:1)) in the preparation of the prepolymer is used. The disadvantage of this method is that both the isocyanate prepolymer and the end product are relatively high viscosity substances which would be difficult to work up.

In DOS No. 3,437,632 it is proposed to lower the monomeric, low molecular weight amine content by selective reaction with mono-, di- and/or polyisocyanates (e.g. propyl isocyanates). This also results in a considerable increase in viscosity.

Lastly, the use of minor quantities of "H-active" compound in the preparation of the isocyanate preliminary products is recommended in DOS No. 3,223,397. Here again, a considerable increase in viscosity occurs in the end product.

SUMMARY OF THE INVENTION

It has now been found that the above-described desirable features and other advantages may be obtained by carrying out the single stage hydrolysis of polyisocyanates to polyamines by maintaining certain water/NCO ratios, using certain water soluble organic solvents, and minimum quantities of catalyst while maintaining homogeneous reaction conditions.

In fact, the proportion of low molecular weight amines in the polyamines obtained by the process of the present invention is considerably lower (<0.6% wt. %) than would be expected from the proportion of free monomeric isocyanates (about 1% wt. %) present in the starting compound, even when isocyanate prepolymers formed at an NCO/OH ratio of 2:1 are used. The hydrolysis according to the invention gives rise to polyamines which contain a very small proportion of free monomeric amines even without thin layered distillation or the addition of isocyanate or the like (as used in DOS No. 3,437,632).

Further, under the conditions of the present invention, hydrolysis may even be carried out at low temperatures.

DETAILED DESCRIPTION OF THE INVENTION

The present invention relates to a single stage process for the production of polyamines containing primary amine groups, preferably aromatically bound amine groups. In this process, a compound containing isocyanate end groups and having an isocyanate content of from 0.5 to 40 wt. % is hydrolyzed with 0.75 to 40 mol of water per equivalent of isocyanate groups in the presence of an organic polar solvent and a small quantity of a catalyst selected from potassium hydroxide, potassium alcoholates, potassium carboxlates, rubidium hydroxide, rubidium alcoholates, rubidium carboxylates, cesium hydroxide, cesium alcoholates, cesium carboxylates and mixtures thereof.

Iscyanates useful in the process of the present invention include modified polyisocyanates, particularly urethane-modified polyisocyanates and isocyanate prepolymers. Hydrolysis in accordance with the present invention results in the direct production of polyamine with evolution of carbon dioxide. The product polyamine may be isolated by known methods but separation of the catalyst employed is generally not necessary. In fact, a major advantage of the process of the present invention is that the quantity of catalyst is so small that no catalyst or reaction products of $CO_2$ with catalysts (e.g. KOH, yielding $KHCO_3$ and $K_2CO_3$) need be filtered off from the product polyamine.

Each of the catalysts suitable for this process is readily soluble in the reaction medium. Distribution equilibria of the kind which may occur when rapidly sedimenting alkali/metal carbonates or bicarbonates are used (as in DE-OS No. 3,223,397) are not therefore a problem.

Moreover, since the catalysts remain in solution or are entirely miscible, they need not be filtered off. The catalysts left in the end product are present in such small quantities that they generally do not interfere with the use of the end product. Since no salts or catalyst residues need be worked up after isolation of the product, this method is also particularly suitable for the preparation of highly viscous or solid compounds containing amino groups from which undissolved residues of salts or other catalyst material have been very difficult to remove.

The process of the present invention is also suitable for the hydrolysis of isocyanate prepolymers based on polyesters. The mild reaction conditions are unlikely to cause decomposition of the ester groups.

Isocyanate prepolymers (particularly those obtained by the reaction of aromatic diisocyanates such as toluylene diisocyanate with polyether polyols or polyester polyols containing two or more hydroxyl groups) are preferably used for the hydrolysis of the present invention. Such isocyanate prepolymers may generally contain a proportion of monomeric, low molecular weight polyisocyanates which are converted into monomeric, low molecular weight amines such as 2,4-toluylene diamine (TDA) during production of the relatively high molecular weight amino compounds.

In the single stage process of the present invention, polyamines containing primary amino groups, preferably with relatively high molecular weight are produced by the hydrolysis of compounds containing isocyanate groups in organic solvents containing water with the addition of basic catalysts. More specifically, a compound containing isocyanate groups, preferably aromatically bound isocyanate groups and having an isocyanate content of 0.5 to 40 wt. %, preferably an isocyanate prepolymer having an isocyanate content of 1.2 to 25% wt. % or modified polyisocyanate having an isocysanate content of 1.5 to 20.5 wt. % is hydrolyzed with 0.75 to 40, preferable 1.5 to 10 mol of water per equivalent of isocyanate groups in the presence of a catalyst and solvent. The catalyst is selected from 0.0001 to 0.099 wt. %, preferably 0.001 to 0.08 wt. % (based on 100 wt. % of isocyanate component) of potassium, rubidium of cesium hydroixides or alcoholates, or 0.0001 to 0.0099 wt. %, preferably 0.001 to 0.008 wt. % (based on isocyanate component), of potassium, rubidium or cesium carboxylates. The solvent is selected from water miscible, polar organic solvent containing nitrile, ketone, sulfoxide or ether groups and boiling within the range of 56° to 250° C., and is used in a quantity of at least 10 wt. %, based on 100 wt. % of isocyanate component, preferably 20 to 2000 wt. %, most preferably 40 to 1,000 wt. %. The reaction mixture is maintained in a homogeneous reaction phase while the hydrolysis is carried out at temperature of from 40° to 170° C., preferably from 50° to 130° C.

The polyamines obtained by the process of the present invention are preferably polyamines containing from 0.46 to 9.52 wt. % of primary, preferably aromatically bound $NH_2$ groups. These polyamines are particularly useful in processes for the production of cellular or non-cellular polyurethanes or polyurethane ureas. The polyamines of the present invention are reacted with polyisocyanates and optionally other compounds containing isocyanate reactive groups, optionally in the presence of known auxiliary agents and additives and/or solvents.

The isocyanate compounds useful in the process of the present invention include isocyanates having two or more aromatic or heterocyclic, preferably aromatic isocyanate groups (hereinafter briefly referred to as "isocyanate compounds"), particularly modified polyisocyanates of the type obtained by partial conversion of the isocyanate groups into urethane, urea, biuret, uretdione, isocyanurate, and/or uretone imine groups, isocyanate prepolymers obtained from polyvalent compounds in the molecular weight range of from 62 to 12,000, preferably from 400 to 6000, containing isocyanate reactive H groups and (excess) quantities of aromatic polyisocyanates and semi-prepolymers (less preferred) obtained from isocyanate prepolymers and additional, low molecular weight polyisocyanates.

Specific examples of suitable modified aromatic polyisocyanates include: polyisocyanates containing urethane groups (obtained by modification with low molecular weight polyols), polyisocyanates containing urea groups (e.g. by modification with water, DE-PS No. 1,230,778), polyisocyanates containing biuret groups (U.S. Pat. Nos. 3,124,605, and 3,201,372, GB Pat. No. 889,050), polyisocyanates containing isocyanurate groups (DE-PS Nos. 1,022,789 and 1,222,067) and dimeric and oligomeric polyisocyanates containing uredione or uretone imine groups. These compounds are all known or obtainable by known methods. Various uretdione polyisocyanates are mentioned in Analytical Chemistry of the Polyurethanes, Volume 16/III, High Polymers Series (Wiley 1969).

The modified polyisocyanates used in the process of the present invention which contain urethane and/or urea and/or biuret and/or uretdione, and/or isocyanurate, and/or uretone imine groups generally have an isocyanate content of from 1.5 to 20.5 wt. %, preferably from 5 to 20.5 wt. %. Particularly preferred among these polyisocyanates are those containing urethane groups (obtained by modifacation with low molecular weight diols and/or polyols (molecular weights 62 to 399)) and having isocyanate contents of from 1.5 to 20.5 wt. %, preferably from 5 to 20.5 wt. %.

The preferred isocyanate compounds used in the process of the present invention are isocyanate prepolymers obtained in a known manner by the reaction of low molecular weight and/or relatively high molecular weight compounds (molecular weight 62 to about 12,000) containing hydroxyl and/or amino and/or thiol groups as reactive groups with an excess of polyisocyanate.

The polyisocyantates used for the preparation of these prepolymers may in principle be any of the known aromatic or heterocyclic di- or polyisocyanates. Such polyisocyanates are described, for example, by W. Siefken in Justus Liebigs Annalen der Chemie, 562 pages 75–136, (1949) and in DE OS No. 3,233,400, pages 15 to 25. The low molecular weight and/or relatively high molecular weight compounds in the molecular weight range of 32 and from 60–12,000 containing hydroxyl and/or amino and/or thiol groups which are suitable for these reactions are also known and described in the above-named disclosures.

The most preferred isocyanate prepolymers may be obtained by reacting relatively high molecular weight polyols (molecular weights 400 to 12,000) with aromatic diisocyanates in an equivalent ratio in the range of from 1:1.5 to 1:2.8 in particular about 1:1.5 to 1:2, optionally in the presence of known chain lengthening agents (molecular weight 62–399).

The isocyanate content of the (preferably urethane-containing) isocyanate prepolymers used is generally from 0.5 to 40 wt. %, preferably 1.2 to 25 wt. %, most preferably 1.5 to 10 wt. % and their functionality is generally from 2 to 8, preferably 2 to 4, in particular 2 3.

So called "semi-prepolymers", i.e. mixtures of isocyanate prepolymers or modified polyisocyanates with other free polyisocyanates may also be used in the process of the present invention.

Water is preferably used in the liquid form. The quantity of water used, based on one equivalent of NCO, is at least 0.75 mol, preferably about 0.75–40 mol, most preferably 1.5–10 mol.

Suitable catalysts include: basic potassium, rubidium or cesium salts, of mono or polycarboxylic acids with up to 18 carbon atoms, or the corresponding alcoholates with 1–6, preferably 1–4 carbon atoms, or the corresponding hydroxides. The catalyst should be free of isocyanate reactive groups. Potassium compounds are preferred, in particular KOH and potassium formate.

Suitable solvents include water miscible polar organic solvents containing nitrile, ketone, sulfoxide or ether groups which boil in the range of from 56 to 250° C. $C_2$–$C_{10}$ aliphatic nitriles, $C_2$–$C_{10}$ aliphatic ketones and/or $C_2$–$C_{10}$ sulfoxides or dioxane are preferred. Acetonitrile, acetone, methyl isopropyl keton and/or dimethylsulfoxide are particularly preferred. Solvents may also be used as mixtures in any proportions.

In selecting the appropriate quantity (in particular the upper limit) of solvent to be used, the following limits should be observed:

1. 20 2000, preferably 40 to 1000 wt. % of solvent should be used in the hydrolysis reaction mixture per 100 wt. % of isocyanate compound and 2. Sufficient water and optionally solvent (d) must be used to form a substantially homogeneous (at the most slightly cloudy) solution or preferably a homogeneous, clear solution with the isocyanate compound at the reaction temperatures. It is particularly preferred to use the quantity of water required to form a monophasic mixture at all temperatures of the process, but always within the above-mentioned ratio of water: NCO-component.

The catalytically active compound is generally added to the solvent and water. Catalyst could occasionally be added to the compound containing isocyanate groups but this is not preferred.

In order to hydrolyze the isocyanate compound to polyamine(s) with a sufficiently high amine number (high conversion rate), it is adavantageous to maintain a concentration of isocyanate compound of $\leq 75$ wt. %, preferably $\leq 55$ wt. % in the reation mixture.

The reaction of the present invention is preferably carried out in a homogeneous phase. A slight excess of water or of isocyanate compound may cause slight cloudiness to form temporarily in the reaction mixture due to incomplete solution of the starting materials.

Care should be taken to ensure that sufficient water is present for complete solution of the quantity of catalyst used.

The reaction may be carried out at temperatures from 40° to 170° C., as already mentioned, but the process is preferably carried out at temperature from 50° to 130° C. because in the best volume/time yields together with high solubility and, surprisingly, the least amount of urea lengthening are abtained at these temperatures. It may in certain cases be necessary to carry out the reaction under pressure in order to maintain the necessary temperatures. It should also be noted that the less polar and/or water soluble the solvent used, the higher should be the dilution and/or the quantity of catalyst and/or the temperature (optionally obtainable by elevated pressure) in order that high $NCO/HN_2$ conversion rates may be obtained. If the quantity of catalyst is increased, it may be necessary to increase the quantity of water in order to ensure complete solution of the catalyst in the reaction mixture.

A few preliminary tests will suffice to determine the optimum proportions of starting compounds for obtaining homogeneous mixtures, always within the above-described proportions.

The onset of the reaction can be seen from the almost spontaneous liberation of $CO_2$. This will take place even at low temperature, e.g. 10° C., but it is much more advantageous to carry out the process of the present invention at the higher temperatures indicated in order to suppress the formation of urea. It is important to ensure very thorough and rapid mixing of the reactants to form a homogeneous solution. This is achieved mainly by the use of solvents but is also assisted by the reduction in viscosity obtained by empolying relatively high reaction temperatures. The reaction may be carried out continuously or batchwise.

DE-OS No. 3,223,397, page 32, line 20 to page 35, line 10, discloses known techniques for carrying out processes of this type on a continuous or batchwise basis.

Working up the reaction mixture may also be carried out continuously or batchwise, using known methods such as extraction, phase separation or distillation.

The reaction mixture is preferably worked up without phase separation by distilling off the solvent or solvent/water mixture at the end of the raction of (no more evolution of $CO_2$ observed), preferably with application of a vacuum (e.g. 1 to 700 Torr, and possibly applying an even higher vaccum, e.g. 0.001 to 1 Torr) to remove volatile residues. It has been found advantageous to employ an initial temperature of about 60° to 100° C. and later to raise temperature to 80°–100° C. The solvent distilled off may be used again, even repeatedly.

The polyamines obtained after working up of the reaction mixture are generally colorless to slightly colored, medium viscosity to high viscosity and optionally relatively high melting products having the amino group contents already indicated. Depending upon the starting materials employed, these polyamines may contain urethane and/or urea and/or uretdione and/or isocyanurate and/or biuret and/or uretone imine groups, and possibly also ether and/or acetal and/or carbonate and/or ester and /or thioether and/or dialkyl siloxane groups and/or the residues of polybutadienes originally present in the isocyanate compounds. Side reactions may also occur, giving rise to additional bonds, e.g. urea groups from components which have already saponified and isocyanate groups still remaining during the hydrolysis reaction. The quantity of primary aromatic amino groups contained in the polyamines is at most equal to the quantity of isocyanate groups present in the isocyanate compounds, i.e. about 0.19 to 15.23 wt. % of $NH_2$ (correrponding to 0.5 to 40 wt. % of NCO), preferably 0.46 to 9.52 wt. % $NH_2$ (corresponding to 1.2 to 25 wt. % NCO) and most preferably 0.58 to 3.81 wt. % $NH_2$ (corresponding to 1.5 to 10 wt. % NCO).

By virtue of their low vapor pressure, the polyamines obtained by the process of the pressure, invention, which are preferably aromatic polyamines, are advantageously used as reactants for free or blocked polyisocyanates used in the procduction of polyurethanes (polyurethane ureas), cellular or non-cellular polyurethane synthetics and polyurethane foams. In these processes, they may be used in combination with other, low molecular weight (molecular weight 32 to 399) and/or relatively high molecular weight (molecular weight 400 to about 12,000) compounds containing isocyanate reactive groups. Suitable starting components for the known process of production of polyurethane synthetics have been mentioned above in the context of the preparation of prepolymers and are also disclosed in DE-A No. 2,302,564 and 2,432,764, U.S. Pat. No. 3,903,679, DE-A Nos. 2,639,083, 2,512,385, 2,513,815, 2,550,796, 2,550,797, 2,550,833, 2,550,860 and 2,550,862. These documents also give indications of auxiliary substances and additives optionally used in the production of polyurethanes.

The present invention relates also to the production of polyurethanes and polyurethane ureas from the polyamines obtained according to the invention. The products produced may be, for example, elastomers, coatings or threads applied from melts, solutions, dispersions or reactions component mixtures.

Other uses for the polyamines prepared according to the present invention include use as coupling components for diazo dyes, hardeners for epoxide and phenol resins and other known reaction of amines, such as the formation of amides or imides etc.

The invention is further illustrated, but is not intended to be limited by the following examples in which all parts and percentages are by weight unless otherwise specified.

EXAMPLES

EXAMPLE 1

An isocyanate prepolymer having an isocyanate content of 3.6% was used in this example. This prepolymer had been prepared by stirring for 3 hours a mixture of a polyether (propylene glycol←propylene oxide) with OH No. 56 and toluylene-2,4-diisocyanate in proportions corresponding to an equivalent ratio of NCO:OH=2:1 at 80° C.

A mixture of 1000 g of acetonitrile, 60 g of water (acetonitrile/water ratio=16.6:1; 4.0 mol of water per NCO equivalent) and 0.2 g of KOH (0.02 wt. % based on the isocyanate prepolymer) was introduced into the reaction vessel and heated to reflux. 1000 g of the prepolymer described above were added within 30 minutes.

Stirring was continued for five minutes after all the prepolymer had been added (evolution of $CO_2$ rapidly dies down) and acetonitrile and water were then distilled off by application of a vaccum (initially 19.5 mbar, then 0.13 mrbar at 80° to 100° C.). The product had the following properties:

NH number ($HClO_4$): 46.9 mg KOH/g
TDA content (%): 0.417

EXAMPLE 2

A mixture of 6,900 g of acetone, 210 g of water acetone/water ratio=32.8:1, 7.78 mol of water per NCO equivalent) and 0.35 g of KOH (0.02 wt. % based on the isocyanate prepolymer) was introduced into the reaction vessel and heated to reflux. 1750 g of the prepolymer from Example 1 containing 3.6% NCO were added within 40 minutes. The reaction mixture was worked up as in Example 1. The product had the following properties:

NH number ($HClO_4$): 42.6 mg KOH/g
NH number ($AC_2O/Py$): 42.9 mg KHO/g
S number ($AC_2O/Py$): <0.1 mg KOH/g
TDA content (%): 0.273

EXAMPLE 3

An isocyanate prepolymer having an isocyanate content of 3.45% was in this example. This prepolymer had been prepared by stirring a mixture of a polyether (propylene glycol←propylene oxide) with OH No. 56 and toluylene-2,4-diisoyanate used in proportions corresponding to an equivalent ratio of NCO:OH=2 'for 3 hours at 80° C.

A mixture of 7,000 g of MEK, 210 g of water (MEK/water ratio=33.3:1; 801 mol of water per NCO equivalent) and 0.35 g of KOH (0.02 wt. % based on the isocyanate prepolymer) was introduced into the reaction vessel and heated to reflux. 1,750 g of the prepolymer described above were added within 40 mintues. The reaction mixture was worked up as in Example 1. The product had the following propreties:

NH number ($HClO_4$): 40.4 mg KOH/g
NH number ($AC_2O/Py$): 41.2 KOH/g
S number ($AC_2O/Py$): <0.1 mg KOH/g
TDA content (%): 0.15

EXAMPLE 4

A mixture of 1,000 g of DMSO, 15 g of water (DMSO/water ratio=66.6:1; 1.94 mol of water per NCO equivalent) and 0.05 g of KOH (0.01 wt. %, based on the isocyanate prepolymer) was introduced into the reaction vessel and heated to reflux. 500 g of the prepolymer from Example 1 containing 3.6% NCO were added within 15 minutes. The reaction mixture was worked up as in Example 1. The product had the following properties:

NH number ($HClO_4$): 47.6 mg KOH/g
NH number ($AC_2 O/Py$): 49.4 mg KOH/g
S number ($AC_2O/Py$): <0.1 mg KOH/g
TDA content (%): 0.529

EXAMPLE 5

In this example, an isocyanate prepolymer having an isocyanate content of 3.2% was prepared by stirring a mixture of a polyether (propylene glycol←propylene oxide) with OH No. 56 and toluylene-2,4-diisocyanate in proportions corresponding to an equivalent ratio of NCO:OH=2:1 at 80° C. for three hours.

A mixture of 1,970 g of acetone, 200 g of water (acetone/water ratio=9.8:1; 29 mol of water per NCO equivalent) and 0.1 g of KOH (0.02 wt. %, based on the isocyanate prepolymer) was introduced into the reaction vessel and heated to reflux. 500 g of the prepolymer described above were added within 15 minutes. The reaction mixture was worked up as in Example 1. The product has an NH number ($HClO_4$) of 42.9 mg KOH/g.

EXAMPLE 6

A mixture of 770 g of acetonitrile, 15 g of water (acetonitrile/water ratio=51.3:1, 1.94 mol of water per NCO equivalent) and 0.05 g of KOH (0.01 wt. %, based on the isocyanate prepolymer) was introduced into a rection vessel and heated to reflux. 500 g of the prepolymer from Example 1 containing 3.6% NCO were added within 15 minutes. The reaction mixture was worked up as in Example 1. The product had the following properties:
NH number ($HClO_4$): 43.7 mg KOH/g
NH number ($AC_2O/Py$): 45.7 mg KOH/g
TDA content (%): 0.393

EXAMPLE 7

A mixture of 1365 g of acetonitrile, 25 g of water (acetonitrile/water ratio=54.6:1; 3.24 mol of water per NCO equivalent) and 0.1 g of KOH (0.02 wt. %, based on the isocyanate prepolymer) was introduced into a reaction vessel and heated to raflux. 500 g of the prepolymer from Example 1 containing 3.6% NCO were added within 15 minutes. The reaction mixture was worked up as in Example 1. The product had the following properties:
NH number ($HClO_4$): 46.1 mg KOH/g
NH number ($AC_2O/Py$): 49.6 mg KOH/g
S number ($AC_2O/Py$): <0.2 mg KOH/g

EXAMPLE 8

A mixture of 46 kg of acetone, 690 g of water (acetone/water ratio=66.6:1, 1.98 mol of water per NCO equivalent) and 2.3 g of KOH (0.01 wt. %, based on the isocyanate prepolymer) was introduced into a reaction vessel and heated to about 100° C. under 3.5 bar. 23 kg of the prepolymer from Example 1 containing 3.52% NCO pre-heated to 50° C. were pumped in within 30 minutes. The reaction mixture was worked up as in Example 1. The product had the following properties:
NH number ($HClO_4$): 43.3 mg KOH/g
TDA content (%): 0.47

EXAMPLE 9

A mixture of 1365 g of acetonitrile, 25 g of water (acetonitrile/water ratio=54.6:1, 3.24 mol of water per NCO equivalent) and 0.1 g of KOH (0.02 wt. %, based on the isocyanate prepolymer) was introduced into the reaction vessel and heated to reflux. 500 g of the prepolymer from Example 1 having an isocyanate content of 3.6% NCO were added within 15 minutes. The reaction mixture was worked up as in Example 1. The product had the following properties:
NH number ($HClO_4$): 46.1 mg KOH/g
NH number ($AC_2O/Py$): 49.6 mg KOH/g
S number ($AC_2O/Py$): <0.2 mg KOH/g

EXAMPLE 10

An isocyanate prepolyumer with an isocyanate content of 2.1% was prepared by stirring at 80° C. a mixture of a polyether (trimethylol propane←83,5% propylene oxide←16,5% ethylenoxide) with OH No. 35 and toluylene-2,4-diisocyanate in proportions corresponding to an equivalent ratio of NCO:OH=2:1 for 3 hours.

A mixture of 2,500 g of acetone, 30 g of water (acetone/water ratio=83.3:1; 6.6 mol of water per NCO equivalent) and 0.1 g of KOH (0.02 wt. % based on the isocyanate prepolymer) was introduced into the reaction vessel and heated to reflux. 500 g of the prepolymer described above were added within 15 minutes. The reaction mixture was worked up as in Example 1. The product had an NH number ($HClO_4$) of 26.5 mg KOH/g.

EXAMPLE 11

An isocyanate prepolymere having an isocyanate content of 3.9% and prepared by stirring at 80° C. of a mixture of a polyester (adipine acid/ethylene glycol) with OH No. 56 and toluylene-2,4-diisocyanate in proportions corresponding to an equivalent ratio of NCO:H=2.1 for three hours was used in this example.

A mixture of 2000 g of acetonitrile, 60 g of water (acetonitrile/water ratio=33.3:1; 7.78 mol of water per NCO equivalent) and 0.2 g of KOH (0.04 wt. %, based on the isocyanate prepolymer) was introduced into the reaction vessel and heated to reflux. 500 g of the prepolymer describe above were added within 15 minutes. The reaction mixture was worked up as in Example 1. The product had the following properties:
NH number ($HClO_4$): 44.1 mg KOH/g
NH number ($AC_2O/Py$): 42.6 KOH/g
S number ($AC_2O/Py$): <0.1 mg KOH/g Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A single stage process for the production of polyamines having primary amino groups in which
   (a) a compound containing isocyanate groups and having an isocyanate content of from 0.5 to 40 wt. % is hydrolyzed with
   (b) 0.75–40 mol of water for each isocyanate equivalent of (a) in the presence of
   (c) 0.0001–0.099 wt. % of a catalyst selected from potassium hydroxide, rubidium hydroxide, cesium hydroxide, potassium alcoholates, rubidium alcoholates, cesium alcoholates or mixtures thereof
   (d) at least 10 wt. % of a water miscible polar organic solvent containing nitrile, ketone, sulfoxide and /or ether groups which boils within the range of 56° to 250° C. as a substantially homogeneous phase at a temperature of from 40° to 170° C.
2. The process of claim 1 in which (a) is an isocyanate prepolymer having an isocyanate content of from 1.2 to 25 wt. %.

3. The process of claim 1 in which (a) is a modified polyisocyanate having an isocyanate content of from 1.5 to 20.5 wt. %.

4. The process of claim 1 in which 0.001–0.008 wt. % (c) is employed.

5. The process of claim 1 in which 1.5–10 mols water per isocyanate equivalent are employed.

6. The process of claim 1 in which (d) is used in a quantity of from 40 to 1000 wt. %.

7. The process of claim 1 in which (c) is a potassium compound.

8. The process of claim 1 in which (c) is KOH.

9. The process of claim 1 in which (d) is acetone, acetonitrile, methylisopropyl ketone and/or dimethyl sulfoxide.

10. A polyamine produced by the process of claim 1.

11. The polyamine of claim 10 containing 0.46 to 9.52 wt. % primary amino groups.

12. The polyamine of claim 11 in which the primary amino groups are aromatically bound.

13. A process for the production of a polyurethane(urea) in which the polyamine of claim 1 is reacted with a polyisocyanate.

* * * * *